US006397205B1

(12) United States Patent
Juola

(10) Patent No.: US 6,397,205 B1
(45) Date of Patent: May 28, 2002

(54) DOCUMENT CATEGORIZATION AND EVALUATION VIA CROSS-ENTROPHY

(75) Inventor: Patrick Juola, Pittsburgh, PA (US)

(73) Assignee: Duquesne University of the Holy Ghost, Pittsburgh, PA (US)

(*) Notice: Subject to any disclaimer, the term of this patent is extended or adjusted under 35 U.S.C. 154(b) by 0 days.

(21) Appl. No.: 09/444,588

(22) Filed: Nov. 22, 1999

Related U.S. Application Data

(60) Provisional application No. 60/109,682, filed on Nov. 24, 1998.

(51) Int. Cl.$^7$ .............................. G06F 17/30; G06F 7/00
(52) U.S. Cl. ............................................................ 707/2
(58) Field of Search .................... 707/1–10, 100–104.1, 707/200–206, 500–542

(56) References Cited

U.S. PATENT DOCUMENTS

| | | | |
|---|---|---|---|
| 4,075,622 A | | 2/1978 | Lawrence et al. |
| 4,775,956 A | | 10/1988 | Kaji et al. |
| 4,823,306 A | | 4/1989 | Barbic et al. |
| 4,964,099 A | | 10/1990 | Carron |
| 4,985,863 A | | 1/1991 | Fujisawa et al. |
| 5,020,019 A | | 5/1991 | Ogawa |
| 5,023,611 A | | 6/1991 | Chamzas et al. |
| 5,204,812 A | | 4/1993 | Kasiraj et al. |
| 5,418,951 A | | 5/1995 | Damashek |
| 5,463,773 A | | 10/1995 | Sakakibara et al. |
| 5,568,640 A | | 10/1996 | Nishiyama et al. |
| 5,761,248 A | | 6/1998 | Hagenauer et al. |
| 5,794,236 A | | 8/1998 | Mehrle |
| 5,835,633 A | * | 11/1998 | Fujisaki et al. ............. 382/156 |
| 6,018,728 A | * | 1/2000 | Spence et al. ................. 706/20 |
| 6,128,613 A | * | 10/2000 | Wong et al. .................... 707/5 |
| 6,212,510 B1 | * | 4/2001 | Brand .......................... 706/12 |
| 6,230,153 B1 | * | 5/2001 | Howard et al. ................. 705/5 |

OTHER PUBLICATIONS

Juola, "What Can We Do With Small Corpora? Document Categorisation Via Cross–Entropy", Proceedings of SimCat 1997, Nov. 28–30, 1997. pp. 137–142.

Farach, et al, "On the Entropy of DNA: Algorithms and Measurements based on Memory and Rapid Convergence", Proceedings of SODA95, Nov. 1, 1994, pp. 1–10.

Juola, "Cross–Entropy and Linguistic Typology", Association for Computational Linguistics, MacQuarie University, Sydney Australia, Jan. 11, 1998, pp. 141–150.

* cited by examiner

*Primary Examiner*—John Breene
*Assistant Examiner*—Linh Pham
(74) *Attorney, Agent, or Firm*—Timothy D. Broms; Pietragallo, Bosick & Gordon

(57) ABSTRACT

A computerized data processing system for categorizing documents that applies candidate functions, such as entropy, cross-entropy, and KL-distance, to data classification is disclosed. A computerized method for categorizing documents employing the candidate functions is also disclosed. The computerized data processing system and method of this invention allows for the automatic categorization, retrieval, and filtration of documents based upon the degree and/or rate of divergence from a reference standard.

14 Claims, 8 Drawing Sheets

S1 := an N-consecutive-character sample of the first document

S2 := an N-consecutive-character sample of the second document total := 0 for each i = 1 to N maximum := 0;

for each j = 1 to N l := the length of the match between S1(i) and S2(j)

if (maximum is less than l)

maximum := l;

endif endfor total := total + maximum end for mean := total / N cross-entropy := N / log(mean)

Fig. 1. Pseudo-code for determining total match length, mean match length, and/or cross-entropy Determine the cross-entropy C (See Fig. 1) between a novel document N and a reference document R if C is closer than a threshold value display N else display nothing endif Fig. 2. An algorithm for filtering given a reference document and a threshold for each document N in the database:

filter N against R as in Fig. 2 end for

Fig. 3. An algorithm for document retrieval

```
min := infinity for each document R in the reference database :

determine cross-entropy C (Fig. 1) between N and R if (C is less than min)

min := C category := R endif end for display category
```

Fig. 4. An algorithm for document categorization

DOCUMENT CATEGORIZATION AND EVALUATION VIA CROSS-ENTROPHY

BENEFIT OF PRIOR PROVISIONAL APPLICATION

This utility patent application claims the benefit of copending prior U.S. Provisional Patent Application Ser. No. 60/109,682, filed Nov. 24, 1998, entitled "Document Categorization And Evaluation Via Cross-Entropy" having the same named applicant as inventor, namely, Patrick Juola, as the present utility patent application.

BACKGROUND OF THE INVENTION

1. Field of the Invention

This invention relates generally to computer-based methods and apparatus for processing data and, more specifically, to an automated document categorization system for filtering, retrieving, and performing similarity judgments among a sample pool of documents.

2. Brief Description of the Background Art

Known document retrieval and filtering systems generally hinge upon the ability of the system to gauge accurately how relevant and useful a selected document is to, for example, a previous document or an established category. A simple example of such a document retrieval and filtering system is one that is based on a technique that looks for keywords, i.e., words designated on a list as relevant, in a document to determine the document's relevancy. Under such a system, any document containing one (or more) keywords is presented as possibly relevant. This technique has many well-known deficiencies to those persons skilled in the art both in its ability to provide coverage of synonyms and contextual accuracy. In addition, other than counting the number of keywords found in a selected document and possibly ranking the documents for prototypicality, it is difficult, using such a keyword based system, to distinguish between documents of the pool that all contain the keywords.

For example, with respect to coverage, documents may contain synonyms of the keywords (e.g., bike/bicycle). With regard to accuracy, many documents may contain the correct word, but with the wrong context/meaning (e.g., suit-of-clothes vs. suit-at-law). Numerous attempts have been made to correct, compensate or improve for the weakness of keyword-based document retrieval systems, such as U.S. Pat. No. 5,020,019 (Ogawa); U.S. Pat. No. 4,985,863 (Fujisawa, et al.); U.S. Pat. No. 4,823,306 (Barbie); and U.S. Pat. No. 4,775,956 (Kaji et al.). However, in contrast to the above-mentioned background art, the present invention is not keyword based and does not rely on the use of keywords at all.

Other document retrieval and filtering systems eschew keywords and instead are based on an incorporation of properties of a previously defined classification scheme, such as U.S. Pat. No. 5,568,640 (Nishiyama, et al.); U.S. Pat. No. 5,463,773 (Sakakibara, et al.); and U.S. Pat. No. 5,204,812 (Kasirj, et al.). Still other known in the art document retrieval and filtering systems are concerned with expected document properties, such as reference lists, such as U.S. Pat. No. 5,794,236 (Mehrle). In contrast, the present invention does not rely on or use previously defined classification schemes or expected document properties.

A fundamental weakness of keyword-based searches is that they are sensitive to document topic only and not to other aspects of document style, sublanguage, and register. This weakness persists in non-keyword-based techniques, such as those relying on incorporation of properties of a previously defined classification scheme or expected document properties for retrieving documents about the same topic. An advantage of the present invention is that it retrieves documents by the same author or in the same sublanguage (such as newspaper editorials) without necessary regard to a topic.

Previous techniques for classifying documents by style or sublanguage, such as described in Biber's book *Dimension of Register Variation: A Cross-Linguistic Comparison* (Cambridge: Cambridge University Press, 1995), and Somers' *An attempt to Use Weighted Cusums to Identify Sublanguage, Proceedings of NemlaP-2*, 1997, have required the identification of specific characteristics of style or sublanguage from a variety of candidate characteristics. In contrast, the present invention uses a single candidate characteristic that encompasses all possible aspects of variation.

U.S. Pat. No. 5,418,951 (Damashek) discloses a method of identifying, retrieving, or sorting documents by language or topic involving the steps of creating an n-gram array for each document in a database, parsing an unidentified document or query into n-grams, assigning a weight to each n-gram, removing the commonality from the n-grams, comparing each unidentified document or query to each database document, scoring the unidentified document or query against each database document for similarity, and based on the similarity of the score, identifying, retrieving, or sorting the document or query with respect to language or topic. In contrast, the present invention provides a direct distance measurement between two documents employing cross-entropy and KL-distance. It is important to note that the fixed n-gram statistics set forth in Damashek requires normalization, and thus, is not sensitive to statistical variation. The method stated in Damashek requires approximately ten documents each having approximately one-thousand characters to obtain a statistically significant sample size on which to perform language identification, and requires approximately fifty documents each having approximately one-thousand characters to obtain a statistically significant sample size on which to perform topic identification. In contrast, the method and computerized data processing system of the present invention may be applied not only to determine document topic or language, but also authorship, register, style and similarity judgments, and requires a sample based on a single document wherein the single document has a small number of characters, for example but not limited to, from about one to one hundred or more characters for estimating the similarity between the two documents.

The candidate function (i.e., entropy, KL-distance, or other information theoretic formalisms known by those skilled in the art) has been used in areas other than text classification such as set forth in U.S. Pat. No. 5,761,248 (Hagenauer, et al.); U.S. Pat. No. 5,023,611 (Chamzas, et al.); U.S. Pat. No. 4,964,099 (Carron); and U.S. Pat. No. 4,075,622 (Lawrence, et al.). The present invention applies these candidate functions to text classification and categorization. Because KL-distance is a metric function, using candidate function allows one to meaningfully measure sublanguage or style divergence. Further, applicant's invention provides for the determination that one author is twice as far from a baseline as a second author, or to determine a probability that a given set of documents was or was not written by one author. Applicant's invention further provides for the filtering and retrieval of documents to allow for the discard of unsolicited commercial electronic mail received at an address on the internet.

Patrick Juola, the present applicant, is the author of "What Can We Do With Small Corpora? Document Categorization via cross-Entropy", *Proceedings of SimCat 1997: An Interdisciplinary Workshop on Similarity and Categorization*, pages 132–142, Nov. 28–30, 1997, that discloses an information system for estimating entropy that produces accurate judgments of language or authorship based on a sample of one or more documents and a document in question, and a method of performing document categorization and similarity judgments. Applicant claims the benefit of priority to U.S. Provisional Patent Application Serial No. 60/109,82, filed Nov. 24, 1998, entitled, "Document Categorization And Evaluation Via Cross Entropy".

In spite of this background art, there remains a very real and substantial need for computer-based methods and apparatus as provided by the instant invention for categorizing documents by applying candidate functions to text classification for filtering, retrieving and performing similarity judgments among a sample pool of documents.

SUMMARY OF THE INVENTION

The present invention has met the above-described need. The computerized data processing system of the present invention provides for efficient and economical document categorization and evaluation by applying candidate functions to data classification. The computerized data processing system for document categorization of the present invention comprises computer processor means for processing data, storage means for storing data on a storage medium, first means for creating a first fixed-size sample of data from a first document, second means for creating a second fixed-size sample of data from a second document, third means for determining a match length within the first document, fourth means for determining the match length of the second fixed-size sample of data, fifth means for determining a mean match length of the second fixed-size sample of data, and sixth means for determining a cross-entropy between the first and second documents. The computer-based processing system of the present invention as described herein, further comprises a seventh means for determining the KL-distance from the first document to the second document, and eighth means for retrieving documents in a document retrieval system employing at least one of the following selected from the group consisting of the total of the sum of the individual match lengths, the mean match length, the cross-entropy and the KL-distance.

Another embodiment of the present invention, as described herein, further comprises categorization means for categorizing documents wherein the cross-entropy is determined between a plurality of the first documents, wherein the first documents are reference documents, and the second document, and wherein the second document is a novel document, and wherein one document selected from the first documents having a value of the cross-entropy closest to zero shall be categorized as the closest document to the second document, and wherein the document categorized as the closest document to the second document shall have its category assigned to the second document.

Another embodiment of the present invention, as described herein, further comprises filtering means for filtering documents wherein the cross-entropy is determined between a plurality of the first documents and the second document, and wherein the second document is a reference document, and wherein one document selected from the first documents having a cross-entropy value higher than a threshold value shall be filtered out.

In yet another embodiment of the present invention, a computerized method for categorizing documents by applying candidate functions to data classification comprising (a) providing a computer processor means for processing data; (b) providing a storage means for storing data on a storage medium; (c) providing a first means for creating a first fixed-size sample of data from a first document; (d) providing a second means for creating a second fixed-size sample of data from a second document; (e) providing a third means for determining a match length within the first document wherein the match length comprises the longest string of consecutive characters of the second fixed-size sample of data that also appears as a string of consecutive characters in the first fixed-size sample of data; (f) providing fourth means for determining the match length at every successive character of the second fixed-size sample of data; (g) providing fifth means for determining a mean match length wherein the mean match length comprises the total sum of the match lengths of the second fixed-size sample of data divided by the number of the characters in the second fixed-size sample of data; (h) providing sixth means for determining a cross-entropy between the first document and the second document, wherein the cross-entropy comprises the logarithm of the number of the characters in the first fixed-size sample of data divided by the mean match length, and wherein the number of the characters in the first fixed-size sample of data is equal to the number of the characters in the second fixed-size sample of data; (i) providing seventh means for determining the KL-distance from the first document to the second document, wherein the KL-distance comprises the difference between the cross-entropy of the first document and an entropy of the first document, and wherein the entropy is the mean match length within the first document; and (j) providing an eighth means for retrieving documents in a document retrieval system using at least one of the following selected from a group of the total sum of the match lengths, the mean match length, the cross-entropy, and the KL-distance.

Another embodiment of the method of the present invention, as described herein, further comprises providing categorization means for categorizing documents and filtering means for filtering documents.

Yet other embodiments of the present invention, as described herein, further provide employing a plurality of second reference documents in performing document categorization.

The computerized data processing system for categorizing documents by applying candidate functions to data classification and the computerized method for document categorization of the present invention will be more fully understood from the following descriptions of the invention, the drawings and the claims appended thereto.

BRIEF DESCRIPTION OF THE DRAWINGS

FIG. 1 is an algorithm expressed in pseudo-code for determining total match length, mean match length, and/or cross-entropy according to the present invention.

FIG. 2 is an algorithm expressed in pseudo-code for filtering given a reference document and a threshold value according to the present invention.

FIG. 3 is an algorithm expressed in pseudo-code for document retrieval according to the present invention.

FIG. 4 is an algorithm expressed in pseudo-code for document categorization according to the present invention.

DETAILED DESCRIPTION OF THE PREFERRED EMBODIMENTS

Figure 5:
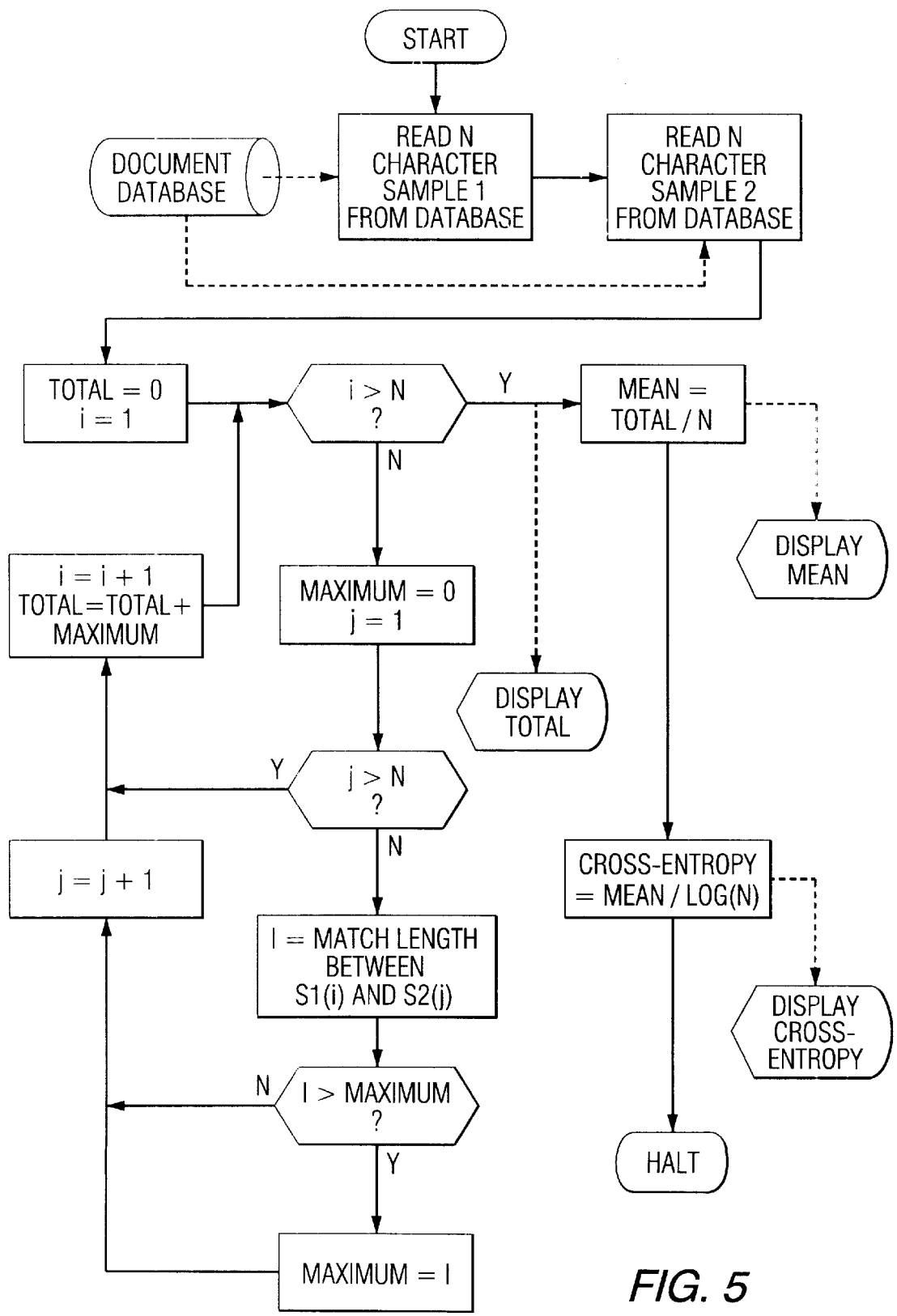
FIG. 5 is a flow diagram of the candidate functions of the computerized data processing system for categorizing documents of the present invention that relates to the pseudo-code of FIG. 1.

Farach et al., "On the entropy of DNA: Algorithms and measurements based on memory and rapid convergence." *Proceedings of SODA95*. 1995, describes a method for measuring the entropy of a single stream of binary data as the mean match length within a historical database. The present invention however, in contrast to the teachings of Farach et al., determines the cross-entropy between two streams of linguistic (or other) data (hereinafter "documents"). FIGS. 1–8 show that a fixed-size sample of one of the streams is taken as a database. For finite linguistic documents, this may be a sample of successive characters from somewhere at the beginning, middle, or end of a first document. A similar sample is taken of the second document.

FIGS. 1–4 show that at every successive character of the second document's sample, the match length within the first document is calculated as the longest string of consecutive characters of the second sample, beginning with the character of choice above, that also appear as consecutive characters somewhere in the sample of the first document. The mean match length is defined as the mean of the individual match lengths, or the total sum of the match lengths divided by the number of characters in the second sample.

When the number of characters in the two samples are equal, the cross-entropy of the distribution is the logarithm of the sample size divided by the mean match length. See FIGS. 1, 2, 4, 5, 6 and 8. The KL-distance from the first document to the second is the difference between the cross-entropy between the two documents and the entropy of the first document alone.

Any of the total match length, mean match length, cross-entropy, or KL-distance can be used in the document retrieval system of the instant invention to retrieve documents closer than (greater match length, smaller cross-entropy, or smaller KL-distance) a given threshold. Documents can be categorized by taking their distances to a set of reference documents and assigning the document of interest the category of the "closest" document. In the present invention, documents can be filtered (see FIGS. 2, 3, 6 and 7) as in the retrieval system of the instant invention, for instance, presenting—or not presenting—all documents closer than a preset, tunable, or learned threshold to a given reference document or documents. Finally, the KL-distance can be used as a measure of distance from a given standard document, allowing properties such as "rate of change" of language to be addressed.

The present invention provides a computerized data processing system for categorizing documents by applying candidate functions to data classification comprising computer processor means for processing data, storage means for storing data on a storage medium, first means for creating a first fixed-size sample of data from a first document, second means for creating a second fixed-size sample of data from a second document, third means for determining a match length within the first document, wherein the match length comprises the longest string of consecutive characters of the second fixed-size sample of data that also appears as a string of consecutive characters in the first fixed-size sample of data, fourth means for determining the match length at every successive character of the second fixed-size sample of data, fifth means for determining a mean match length, wherein the mean match length comprises the total sum of the match lengths of the second fixed-size sample of data divided by the number of the characters in the second fixed-size sample of data, sixth means for determining a cross-entropy between the first document and the second document, wherein the cross-entropy comprises the logarithm of the number of the characters in the first fixed size sample of data divided by the mean match length, and wherein the number of the characters in the first fixed-size sample of data is equal to the number of the characters in the second fixed-size sample of data, seventh means for determining a KL-distance from the first document to the second document, wherein the KL-distance comprises the difference between the cross-entropy of the first document and an entropy of the first document, wherein the entropy is the mean match length within the first document, and eighth means for retrieving documents in a document retrieval system using at least one of the following selected from the group consisting of the total sum of the match lengths, the mean match length, the cross-entropy, and the KL-distance.

Figure 8:
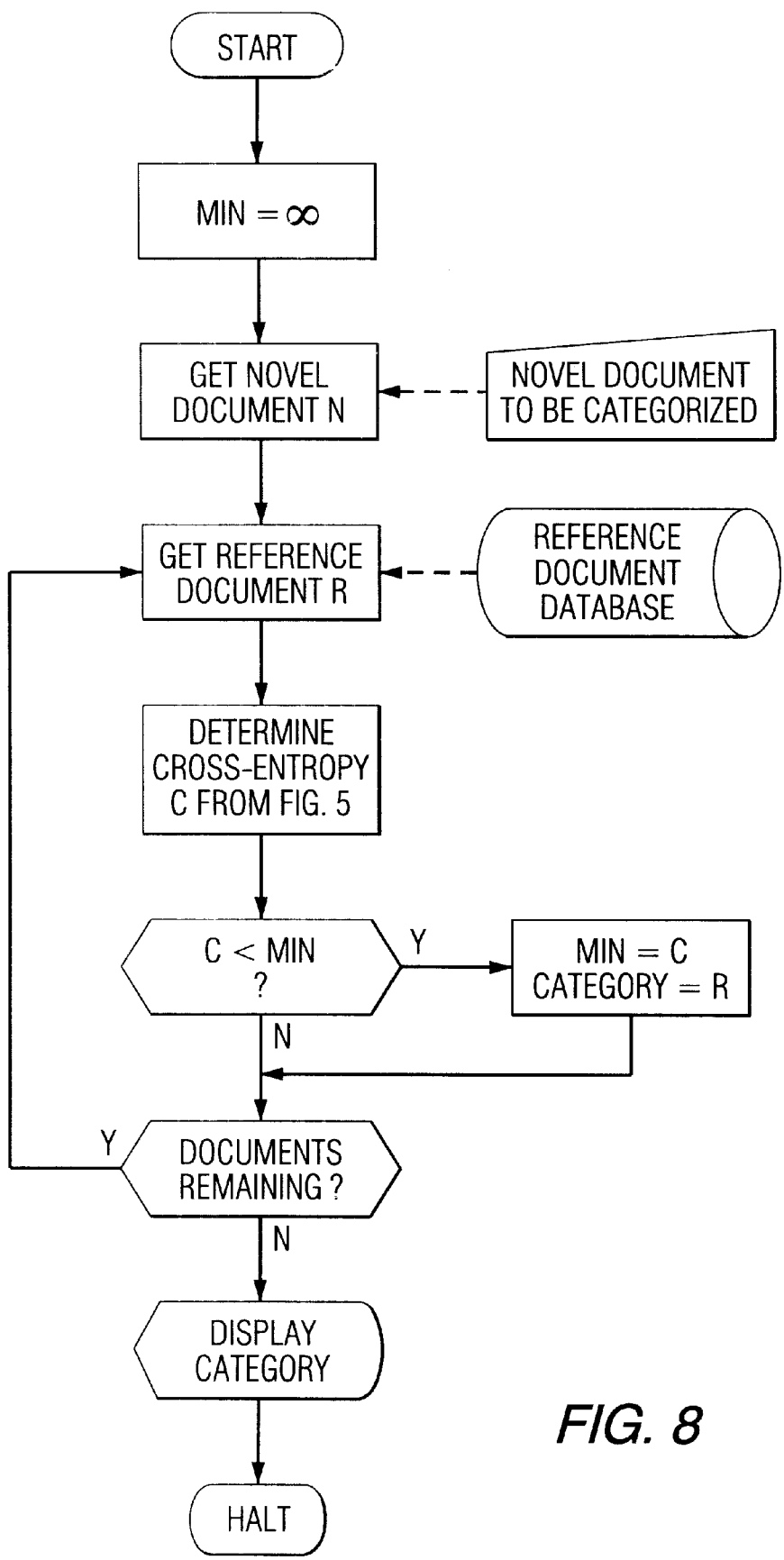
FIG. 8 is a flow diagram for document categorization under the method of the present invention and relates to the algorithm for document categorization of FIG. 4.

In a further embodiment of the present invention, as described herein, and as set forth in FIGS. 4 and 8, the computerized data processing system comprises categorization means for categorizing documents wherein the cross-entropy is determined between a plurality of the first documents, wherein the plurality of first documents are reference documents, and the second document, wherein the second document is a novel document, and wherein one document selected from the first documents with a value of the cross-entropy closest to zero shall be categorized as the closest document of the plurality of first documents to the second document, and wherein the document categorized as the closest document to the second document shall have its category assigned to the second document.

Figure 6:
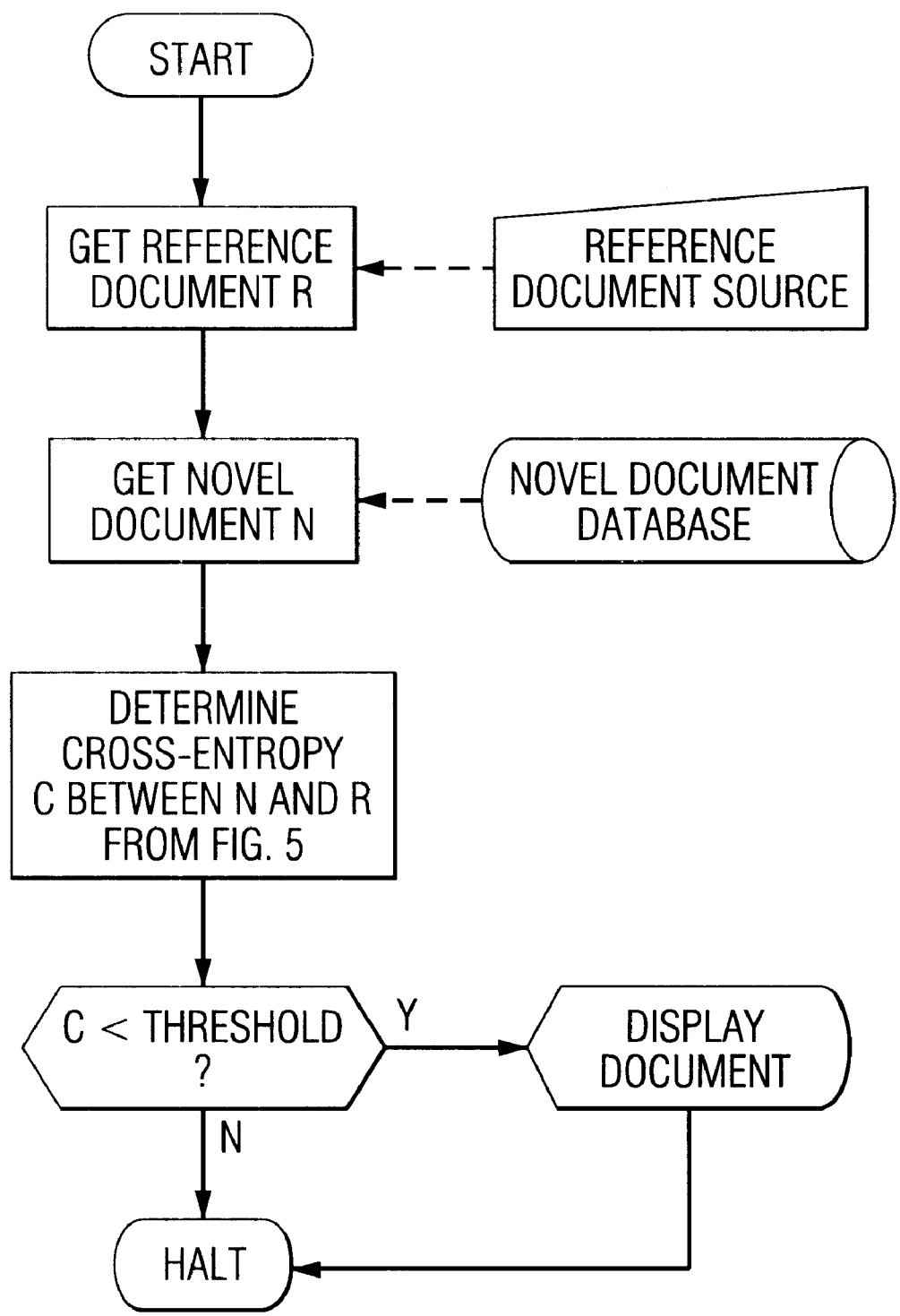
FIG. 6 is a flow diagram for filtering documents under the method of the present invention and relates to the algorithm for document filtration of FIG. 2.
Figure 7:
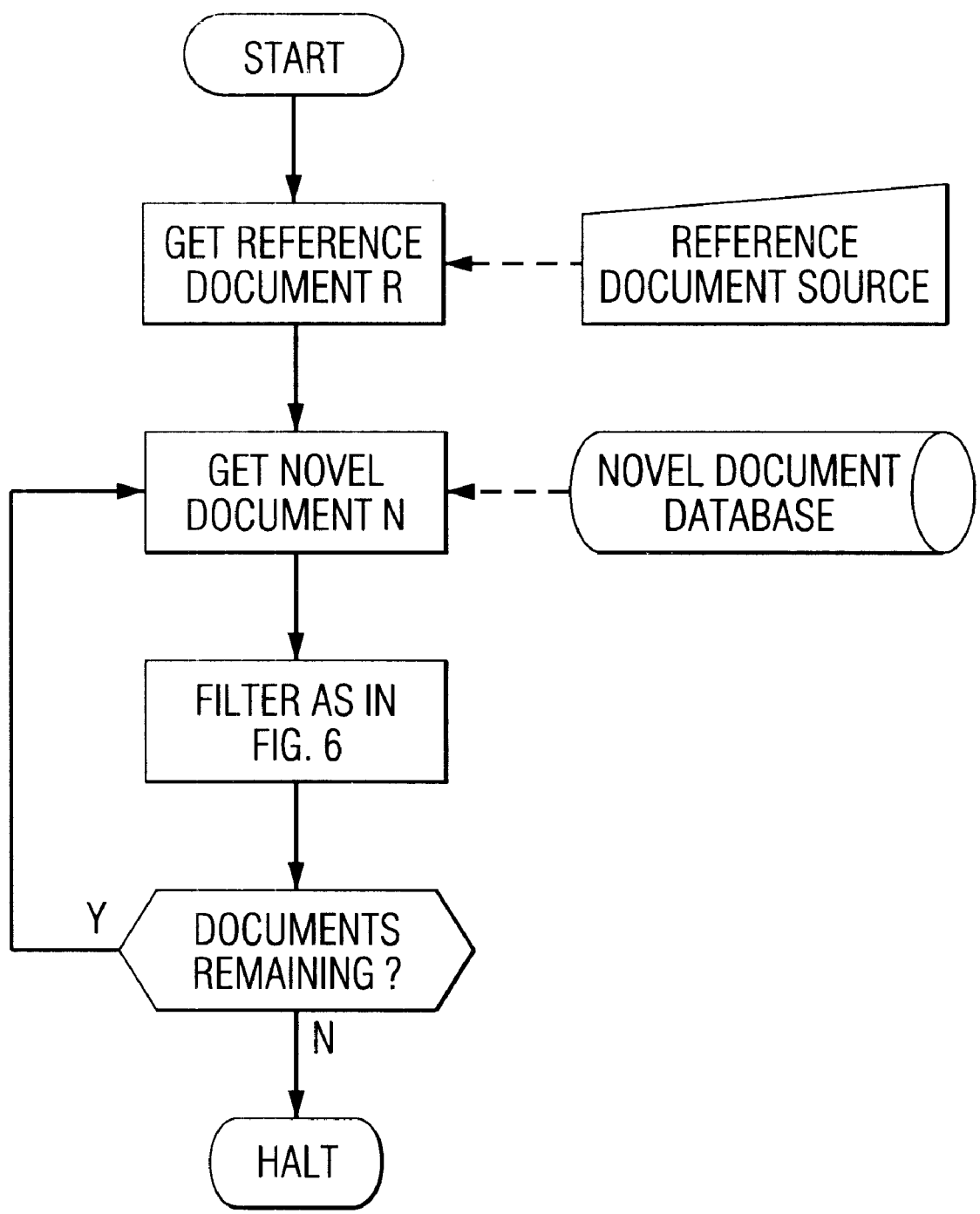
FIG. 7 is a flow diagram for retrieving documents under the method of the present invention and relates to the algorithm for document retrieval of FIG. 3.

In another embodiment of the present invention, as described herein, and as shown in FIGS. 2 and 6, the computerized data processing system comprises filtering means for filtering documents wherein the cross-entropy is determined between a plurality of the first documents and the second document, wherein the second document is a reference document, and wherein one document selected from the first documents with a value of the cross-entropy higher than a threshold value shall be filtered out.

Another embodiment of the present invention, as described herein, further comprises means for determining similarities in language style of a plurality of documents wherein the KL-distance is determined between a plurality of the first documents and a second document, wherein the second document is a reference document. Two documents that are nearly identical or are identical shall approach or have a KL-distance value of zero, respectively.

It will be appreciated by those persons skilled in the art that the computerized data processing system of the present invention for document categorization, filtration and similarity determinations may employ a plurality of second documents as the second reference document.

The present invention provides a computerized method for categorizing documents by applying candidate functions to data classification comprising providing a computer processor means for processing data, providing a storage means for storing data on a storage medium, determining a first fixed-size sample of data from a first document, determining a second fixed-size sample of data from a second document, determining the match length within the first document wherein the longest string of consecutive characters of the second fixed-size sample of data that also appears as a string of consecutive characters in the first fixed-size sample of data, determining the match length at every successive character of the second fixed-size sample, determining the mean match length wherein the mean match length comprises the total sum of the match lengths of the second fixed-size sample of data divided by the number of the characters in the second fixed-size sample of data, determining the cross-entropy of the distribution (between the first document and the second document) wherein the cross-entropy comprises the logarithm of the number of the characters in the first fixed-size sample or the number of the characters in the second fixed-size sample divided by the mean match length, and wherein the number of the characters in the first fixed-size sample of data is equal to the number of the characters in the second fixed-size sample of data, determining the KL-distance from the first document to the second document wherein the KL-distance comprises the difference between the cross-entropy and the entropy of the first document wherein the entropy is the mean match length within the first document, and retrieving documents in a document retrieval system using at least one of the following selected from the total sum of the match lengths, the mean match length, the cross-entropy, and the KL-distance.

Another embodiment of the method of the present invention, as described herein, further comprises providing categorization of the first documents by determining the cross-entropy between a plurality of the first documents, wherein the plurality of the first documents are reference documents, and the second document, wherein the second document is a novel document, and wherein the one document selected from the first documents with a value of cross-entropy closest to zero shall be categorized as the closest document to the second document, and wherein the document categorized as the closest document to the second document shall have its category assigned to the second document.

Another embodiment of the method of the present invention, as described herein, and as shown in FIGS. 2 and 6, further comprises providing filtration of the first documents by determining the cross-entropy between a plurality of the first documents and the second document, wherein the second document is a reference document, and wherein one document selected from the first documents with a cross-entropy value higher than a threshold value shall be filtered out.

It will be understood by those persons skilled in the art that the computerized method of the present invention for document categorization, filtration, and similarity determinations may employ a plurality of second documents as the second reference document.

The present invention's computer-based document categorization system and method provides for the filtering of documents, such as, for example, obtained while one is searching, for example the Internet, for information regarding a particular topic. The present invention provides for the filtering of, for example, newspaper text, scientific text, or advertising text, if the operator believes, for example, that medical scientific articles would be more informative than advertising articles for information regarding a particular health claim of a health care product.

Similarly, the computer-based document categorization system and method of the instant invention provides for the automatic filtration of inappropriate electronic mail or Web pages prior to presentation to an operator using the Internet or to a provider of Internet services. Thus, the present invention allows for the automatic discard of inappropriate junk electronic mail that is unsolicited without requiring human intervention in reviewing the incoming electronic mail that is subsequently automatically discarded by the computer-based document categorization system and method of this invention.

It will be appreciated by those persons skilled in the art that the computer-based document categorization system and method of the present invention that provides for measuring the cross-entropy between character streams of two different documents permits one to arrive at a distance between the two documents that describes the amount that a description of one document in terms of various characteristics, such as alphabet, character frequency, word choice, register and individual writing style, describes or does not describe the second document. Thus, it will be understood by those persons skilled in the art that the present invention is a significant improvement over the background art. A further advantage of the present invention is that it provides a method of document categorization that requires only a sample based on a single document, wherein the single document has a small number of characters, for example, but not limited to, from 1 to one hundred or more characters, for estimating the similarity between two documents and categorizing them based upon the closest similarity. Thus, the instant invention may be employed to automatically grade essays and automatically detect plagiarism or forgery of documents based upon aspects of individual writing style. Further, the instant invention may be employed for determining the rate of linguistic change among documents. It will be appreciated by those skilled in the art that preprocessing of sample documents, for example, by converting all lower case characters of the alphabet to upper case, or vice-versa, shall improve the performance of the method and the computer-based document categorization system of the present invention.

Whereas, particular embodiments of the present invention have been described herein for the purpose of illustration. It will be evident to those skilled in the art that numerous variations of the details of the present invention may be made without departing from the invention as defined in the appended claims.

We claim:

1. A computerized data processing system for categorizing documents by applying candidate functions to data classification comprising:
   a. computer processor means for processing data;
   b. storage means for storing data on a storage medium;
   c. first means for creating a first fixed-size sample of data from a first document;
   d. second means for creating a second fixed-size sample of data from a second document;
   e. third means for determining a match length within said first document, wherein said match length comprises the longest string of consecutive characters of said second fixed-size sample of data that also appears as a string of consecutive characters in said first fixed-size sample of data;
   f. fourth means for determining said match length at every successive character of said second fixed-size sample of data;

g. fifth means for determining a mean match length, wherein said mean match length comprises the total sum of said match lengths of said second fixed-size sample of data divided by the number of said characters in said second fixed-size sample of data;

h. sixth means for determining a cross-entropy between said first document and said second document, wherein said cross-entropy comprises the logarithm of the number of said characters in said first fixed-size sample of data divided by said mean match length, and wherein the number of said characters in said first fixed-size sample of data is equal to the number of said characters in said second fixed-size sample of data;

i. seventh means for determining a KL-distance from said first document to said second document, wherein said KL-distance comprises the difference between said cross-entropy of said first document and an entropy of said first document, wherein said entropy is the mean match length within said first document; and j. eighth means for retrieving documents in a document retrieval system using at least one of the following selected from the group of said total sum of said match lengths, said mean match length, said cross-entropy, and said KL-distance.

2. The data processing system of claim 1 further comprising categorization means for categorizing documents wherein said cross-entropy is determined between a plurality of said first documents, wherein said plurality of said first documents are reference documents, and said second document, wherein said second document is a novel document, and wherein one document selected from said first documents with a value of said cross-entropy closest to zero shall be categorized as the closest document to said second document, and wherein said document categorized as the closest document to said second document shall have its category assigned to said second document.

3. The data processing system of claim 2 further comprising wherein said second document is a plurality of documents.

4. The data processing system of claim 1 further comprising similarity detection means for filtering documents wherein said cross-entropy is determined between a plurality of said first documents and said second document, wherein said second document is a reference document, and wherein one document selected from said first documents with a value of said cross-entropy higher than a threshold value shall be filtered out.

5. The data processing system of claim 4 further comprising wherein said second document is a plurality of documents.

6. The data processing system of claim 1 further comprising similarity detection means for determining similarities in language style of a plurality of documents wherein said KL-distance is determined between a plurality of said first documents and a said second document, wherein said second document is a reference document, and wherein one document selected from said plurality of first documents having a KL-distance closest to zero is closest in similarity to said second document.

7. The data processing system of claim 6 further comprising wherein said second document is a plurality of documents.

8. A computerized method for categorizing documents by applying candidate functions to data classification comprising:

a. providing a computer processor means for processing data;

b. providing a storage means for storing data on a storage medium;

c. determining a first fixed-size sample of data from a first document;

d. determining a second fixed-size sample of data from a second document;

e. determining the match length within said first document consisting of the longest string of consecutive characters in said second fixed-size sample of data that also appears as a string of consecutive characters in said first fixed-size sample of data;

f. determining said match length at every successive character of said second fixed-size sample;

g. determining a mean match length, wherein said mean match length comprises the total sum of said match lengths of said second fixed-size sample of data divided by the number of said characters in said second fixed-size sample of data;

h. determining the cross-entropy between said first document and said second document, wherein said cross-entropy comprises the logarithm of the number of said characters in said first fixed-size sample of data divided by said mean match length, wherein the number of said characters in said first fixed-size sample of data is equal to the number of said characters in said second fixed-size sample of data;

i. determining a KL-distance from said first document to said second document, wherein said KL-distance comprises the difference between said cross-entropy of said first document and an entropy of said first document, wherein said entropy is the mean match length within said first document; and j. retrieving documents in a document retrieval system using at least one of the following selected from said total sum of said match lengths, said mean match length, said cross-entropy, or said KL-distance.

9. The computerized method for categorizing documents of claim 8 further comprising providing categorization of said first documents by determining said cross-entropy between a plurality of said first documents, wherein said plurality of said first documents are reference documents, and said second document, wherein said second document is a novel document, and wherein one document selected from said plurality of said first documents having a cross-entropy value closest to zero shall be categorized as the closest document to said second document, and wherein said document categorized as the closest document to said second document shall have its category assigned to said second document.

10. The computerized method of claim 9 further including wherein said second document is a plurality of documents.

11. The computerized method for filtering documents of claim 8 further comprising providing filtration of said first documents by determining said cross-entropy between a plurality of said first documents and said second document, wherein said second document is a reference document, and wherein one document selected from said plurality of said first documents having a cross-entropy value higher than a threshold value shall be filtered out.

12. The computerized method of claim 11 further including wherein said second document is a plurality of documents.

13. The computerized method for categorizing documents of claim 8 further comprising providing similarity judgment characterization of said first documents by determining said KL-distance between a plurality of said first documents and said second document, wherein said second document is a reference document, and wherein one document selected from said plurality of said first documents having a KL-distance closest to zero is closest in similarity to said second document.

14. The computerized method of claim 13 further including wherein said second document is a plurality of documents.

* * * * *

UNITED STATES PATENT AND TRADEMARK OFFICE
CERTIFICATE OF CORRECTION

PATENT NO. : 6,397,205 B1
DATED : May 28, 2002
INVENTOR(S) : Patrick Juola

It is certified that error appears in the above-identified patent and that said Letters Patent is hereby corrected as shown below:

<u>Title page, Item [54], Column 1, Line 1,</u>
Title, "DOCUMENT CATEGORIZATION AND EVALUATION VIA CROSS-ENTROPHY" should read -- DOCUMENT CATEGORIZATION AND EVALUATION VIA CROSS-ENTROPY --.

Signed and Sealed this

Twentieth Day of July, 2004

JON W. DUDAS
*Acting Director of the United States Patent and Trademark Office*